US012617457B2

(12) United States Patent
Kim

(10) Patent No.: US 12,617,457 B2
(45) Date of Patent: May 5, 2026

(54) DEVICE FOR AND METHOD OF COMPENSATING FOR DISTURBANCE IN RACK FORCE

(71) Applicant: HYUNDAI MOBIS CO., LTD., Seoul (KR)

(72) Inventor: Ji Sung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 475 days.

(21) Appl. No.: 18/190,233

(22) Filed: Mar. 27, 2023

(65) Prior Publication Data

US 2024/0116566 A1     Apr. 11, 2024

(30) Foreign Application Priority Data

Oct. 5, 2022    (KR) ........................ 10-2022-0126971

(51) Int. Cl.
B62D 5/04          (2006.01)
B62D 6/00          (2006.01)
(52) U.S. Cl.
CPC .................................... B62D 6/008 (2013.01)
(58) Field of Classification Search
CPC .............................. B62D 5/0463; B62D 6/008
See application file for complete search history.

(56) References Cited

U.S. PATENT DOCUMENTS

| | | | | | |
|---|---|---|---|---|---|
| 6,651,771 | B2 * | 11/2003 | Chabaan | .................. | B62D 6/10 |
| | | | | | 701/42 |
| 7,860,624 | B2 * | 12/2010 | Kubota | ................ | B62D 5/0463 |
| | | | | | 701/1 |

| | | | | |
|---|---|---|---|---|
| 2017/0183031 | A1 | 6/2017 | Ko | |
| 2018/0015945 | A1 | 1/2018 | Kim | |
| 2020/0023889 | A1 * | 1/2020 | Rohrmoser | .......... B62D 5/0463 |
| 2021/0354750 | A1 | 11/2021 | Kim | |
| 2022/0371659 | A1 * | 11/2022 | Hambloch | ............. B62D 6/008 |

FOREIGN PATENT DOCUMENTS

| | | |
|---|---|---|
| DE | 10 2008 042 666 A1 | 5/2010 |
| DE | 10 2016 014 562 A1 | 6/2017 |
| KR | 10-1720313 B1 | 4/2017 |
| KR | 10-2017-0078405 A | 7/2017 |
| KR | 10-2018-0007393 A | 1/2018 |

(Continued)

OTHER PUBLICATIONS

Korean Office Action issued on Oct. 5, 2024, in counterpart Korean Patent Application No. 10-2022-0126971 (4 pages in English, 4 pages in Korean).

(Continued)

*Primary Examiner* — Gonzalo Laguarda
(74) *Attorney, Agent, or Firm* — NSIP Law

(57)          ABSTRACT

Disclosed is a device for compensating for a disturbance in a rack force. The device includes a memory that stores instructions, and processors that determine an optimally estimated value of a rack force for minimizing an error representing a difference between an actual value of the rack force and an estimated value of the rack force, extract a specific frequency component from the optimally estimated value of the rack force, and compensate for the extracted specific frequency component to the actual value of the rack force to remove a disturbance reflected in the actual value of the rack force.

11 Claims, 4 Drawing Sheets

(56)                   References Cited

FOREIGN PATENT DOCUMENTS

| | | |
|---|---|---|
| KR | 10-2019-0041618 A | 4/2019 |
| KR | 10-2021-0052817 A | 5/2021 |
| KR | 10-2314349 B1 | 10/2021 |

OTHER PUBLICATIONS

Korean Office Action issued on Dec. 10, 2024 in corresponding Korean Patent Application No. 10-2022-0126971. (6 pages in Korean).

German Office Action Issued on Jan. 7, 2025, in Counterpart German Patent Application No. 102023102609.7 (4 Pages in English, 4 Pages in German).

\* cited by examiner

200

DEVICE FOR AND METHOD OF COMPENSATING FOR DISTURBANCE IN RACK FORCE

CROSS-REFERENCE TO RELATED APPLICATION

This application claims the benefit under 35 USC § 119(a) of Korean Patent Application No. 10-2022-0126971, filed on Oct. 5, 2022, in the Korean Intellectual Property Office, the entire disclosure of which is incorporated herein by reference for all purposes.

BACKGROUND

1. Field

The present disclosure relates to a device for and a method of compensating for a disturbance in a rack force, the device and the method being capable of minimizing a delay in acquiring an estimated value of a rack force, and removing a disturbance reflected in the estimated value of the rack force.

2. Description of Related Art

Power steering systems have been developed and used to assist a driver in operating a steering wheel in driving a vehicle. The power steering systems are categorized into a hydraulic steering system that uses a hydraulic force, a motor-driven hydraulic steering system that uses the hydraulic force and an electromotive force of a motor at the same time, a motor-driven steering system that uses only the electromotive force of the motor, and the like.

In recent years, steer-by-wire (SBW) systems have been developed and used. In SBW systems, a mechanical connection, such as a steering column, a universal joint, or a pinion shaft, between a steering wheel and a vehicle wheel is removed, and vehicle steering is performed by controlling driving of the motor connected to a rack bar using an electrical signal.

In SBW systems, a rotational signal of the steering wheel is received through an electronic control unit (ECU), and a steering assistant motor (hereinafter referred to as a "steering motor") connected to the drive wheel is operated based on the received rotational signal, thereby steering the vehicle.

SBW systems do not have a mechanical connection structure of an existing steering system. Thus, SBW systems have the advantage of increasing the degree of layout design freedom varying with a configuration of a steering system, improving fuel efficiency, removing a disturbance input in the reverse direction from the vehicle wheel, and the like.

For control in the traverse direction of the vehicle and control of the degree of a feeling of steering, it is very important to recognize a transverse force (a force transferred to a rack bar=a rack force) on an inner surface of a tire because the transverse force exerts a great influence on the control of the degree of the feeling of steering, as well as the control of the vehicle.

In SBW systems, there is a need to measure or estimate the rack force and to notify the driver of information on a road surface. Accordingly, in SBW systems, a transverse force of a front wheel that is steered is estimated and measured. For example, the rack force may be estimated by estimating the transverse force through a vehicle dynamics model, or using a steering system model.

In the case of a value of the rack force that is estimated in this manner, due to various causes, such as a mechanism of the SBW system and a state of a road surface, a specific frequency signal may be amplified or a disturbance may occur. A steering-wheel reaction force is determined by the estimated value of the rack force, and thus the disturbance decreases the degree of a feeling of steering that the driver experiences.

Accordingly, a filter, such as a low pass filter, a notch filter, or a Kalman filter is used in order to remove the disturbance from the estimated value of the rack force.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a device for compensating for a disturbance in a rack force is provided. The device includes a memory that stores instructions, and processors that determine an optimally estimated value of a rack force for minimizing an error representing a difference between an actual value of the rack force and an estimated value of the rack force, extract a specific frequency component from the optimally estimated value of the rack force, and compensate for the extracted specific frequency component to the actual value of the rack force to remove a disturbance reflected in the actual value of the rack force.

The processors may execute an optimization algorithm to minimize the error and determine the optimally estimated value of the rack force.

The processors may define an objective function based on the error, and apply the optimization algorithm to a gradient of the objective function to determine the optimally estimated value of the rack force.

The optimally estimated value of the rack force may include a linear component and a vibration component, and the specific frequency component may be the vibration component included in the optimally estimated value of the rack force.

The processors may subtract the vibration component from the actual value of the rack force to remove the disturbance from the actual value of the rack force.

In another general aspect, there is provided a method of compensating for a disturbance in a rack force. The method includes determining, by a processor, an error representing a difference between an actual value of a rack force and an estimated value of the rack force, determining, by the processor, an optimally estimated value of the rack force for minimizing the error, and removing, by the processor, a disturbance reflected in the actual value of the rack force based on subtracting a specific frequency component included in the optimally estimated value of the rack force from the actual value of the rack force.

Determining the optimally estimated value of the rack force may further include executing an optimization algorithm to minimize the error and determine the optimally estimated value of the rack force.

Determining the optimally estimated value of the rack force may further include defining an objective function based on the error, and applying the optimization algorithm to a gradient of the objective function to determine the optimally estimated value of the rack force.

The optimally estimated value of the rack force may include a linear component and a vibration component, and the specific frequency component may be the vibration component included in the optimally estimated value of the rack force.

The method may further include subtracting the vibration component from the actual value of the rack force to remove the disturbance from the actual value of the rack force.

Other features and aspects will be apparent from the following detailed description, the drawings, and the claims.

Figure 1:
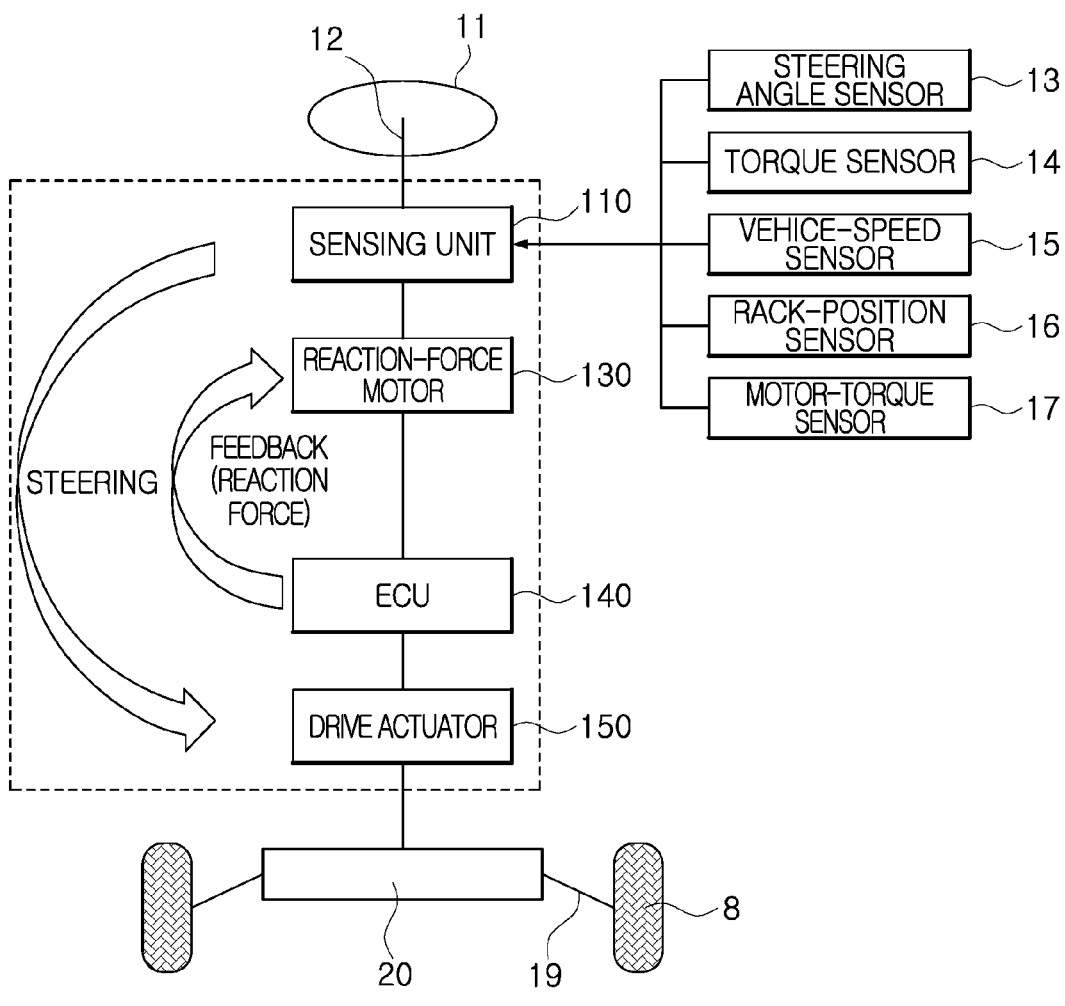
FIG. 1 is a view illustrating an SBW system in which a device for compensating for a disturbance in a rack force according to a first embodiment of the present disclosure may be used.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

A device for and a method of compensating for a disturbance in a rack force according to first and second embodiments, respectively, of the present disclosure are in detail described below with reference to the accompanying drawings. For clarity and convenience in description, thicknesses of lines, sizes of constituent elements, and the like may be illustrated in non-exact proportion in the drawings. In addition, a term defined by considering the meaning thereof in the present disclosure will be used below and may vary according to the user's or manager's intention or according to practices in the art. Therefore, the term should be defined in context in light of the present specification.

A feature of the present disclosure described in the present specification may be realized, for example, in the form of a method, a process, an apparatus, a software program, a data stream, or a signal. The feature, although described in terms of realization in the form of a single form (for example, described as only in the form of a method), may also be realized in a different form (for example, in the form of an apparatus or a program). The apparatus may be implemented in the form of adequate hardware, software, firmware, or the like. The method, for example, may be realized in an apparatus, such as a computer, a microprocessor, or a processor that generally refers to a processing device, such as an integrated circuit or a programmable logic device. Examples of the apparatus also include a computer and a communication device, such as a cellular phone or a portable/personal information terminal (a personal digital assistant ("PDA"), that facilitate communication of information between end users.

FIG. 1 is a view illustrating an SBW system in which a device for compensating for a disturbance in a rack force according to a first embodiment of the present disclosure may be used.

With reference to FIG. 1, the SBW system in which the device for compensating for a disturbance in a rack force according to the first embodiment of the present disclosure may be used may include a steering wheel 11, a steering column 12 supporting the steering wheel 11, a reaction-force motor 130 driven by an electronic control unit (ECU) 140, a sensing unit 110 positioned on one side of the steering column 12, the reaction-force motor 130, or a rack bar 20 and obtaining steering-related information and rack-position information, the ECU 140 generating a control signal for steering reaction-force torque and a steering auxiliary force, through an assistant electric-current control map, on the basis of vehicle-speed information, and one or more steering motors or drive actuators 150 that steer left and right wheels 18, respectively, of a vehicle, with the control signal of the ECU 140.

In the SBW system, a steering torque sensor 14, a steering angle sensor 13, and the like, which are mounted on the reaction-force motor 130, and the steering column 12, may be expressed as steering feedback actuators (SFAs) that constitute a high-level terminal of the SBW system, the steering motor or drive actuator 150, or the like for driving the rack bar 20 may be expressed as a road wheel actuator (RWA) that constitutes a low-level terminal of the SBW system.

In an SBW system 1 having a rack-and-pinion component, steering torque occurring due to rotation of the steering wheel 11 may be transferred to the rack bar 20 through a rack-and-pinion mechanism, and the steering auxiliary force occurring in the drive actuator 150 may be transferred to the left and right wheels 18 through a tie rod 19 and the rack bar 20.

At this point, the sensing unit 110 may include at least one of the steering angle sensor 13 detecting a change of rotation of the steering column 12 that varies according to operation of the steering wheel 11 by a driver, the steering torque sensor 14 installed on one side of each of the reaction-force motor 130 and the steering column 12 and measuring steering torque applied to the steering column 12 or reaction-force torque output from the reaction-force motor 130, a vehicle-speed sensor 15 measuring a speed of the vehicle, a rack-position sensor 16 positioned on the rack bar 20 and obtaining the rack-position information, and a motor-torque sensor 17 measuring torque of the drive actuator 150. Alternatively, the sensing unit 110 may receive sensing information from the sensors mentioned above.

As the drive actuator 150 operates, the rack bar 20 is moved. Thus, when the left and right wheels 18 are moved, a friction force Ffric of the SBW system and a rack force transferred from the left and right wheels 18 are exerted.

The ECU 140 may measure an actual value of the rack force and, on the basis of the measured actual value of the rack force, may perform vehicle control or control of the reaction-force motor 130 for generating a steer-by-wire (SBW) steering reaction force.

The measured actual value of the rack force reflects a disturbance, and the disturbance may decrease the degree of a feeling of steering that the driver experiences. Accordingly, the ECU 140 may include a device 200 for compensating for a disturbance in a rack force that removes the disturbance reflected in the actual value of the rack force. The device 200 for compensating for a disturbance in a rack force is in detail described with reference to FIG. 2.

Figure 2:
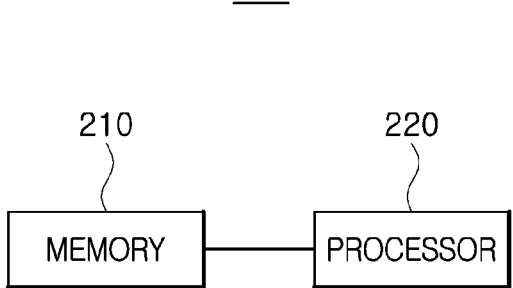
FIG. 2 is a view that is referred to for description of a configuration of the device for compensating for a disturbance in a rack force according to the first embodiment of the present disclosure.
Figure 3:
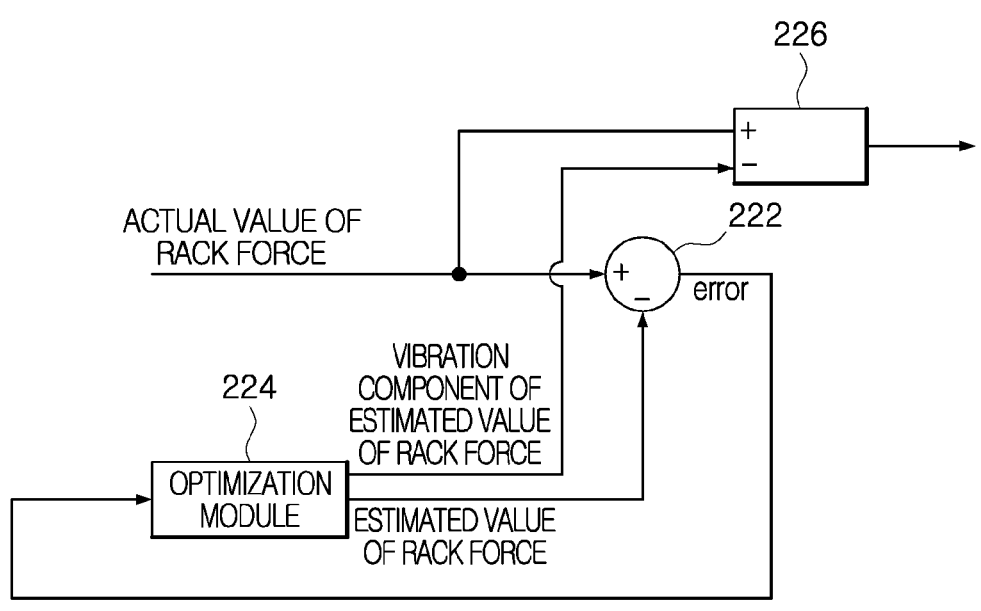
FIG. 3 is a view that is referred to for description of operation of the device for compensating for a disturbance in a rack force according to the first embodiment of the present disclosure.

FIG. 2 is a view that is referred to for description of a configuration of the device 200 for compensating for a disturbance in a rack force according to the first embodiment of the present disclosure. FIG. 3 is a view that is referred to for description of operation of the device 200 for compensating for a disturbance in a rack force according to the first embodiment of the present disclosure.

With reference to FIG. 2, the device 200 for compensating for a disturbance in a rack force according to the first embodiment of the present disclosure includes a memory 210 and a processor 220.

The memory 210 is configured in such a manner that data associated with the operation of the device 200 for compensating for a disturbance in a rack force are stored therein. Particularly, an application (a program or an applet) or the like may be stored in the memory 210. Through the application, an optimally estimated value of the rack force is acquired (for example, determined) by applying an optimization algorithm to an error representing a difference between the actual value of the rack force and the estimated value of the rack force. Then, the disturbance reflected in the actual value of the rack force may be removed by compensatingly subtracting a specific frequency component of the optimally estimated value of the rack force from the actual value of the rack force. Stored pieces of information may be selected by the processor 220 according to need. Stored in the memory 210 are various types of pieces of data that are generated while executing an operation system or an application (a programs or an applet) for driving the device 200 for compensating for a disturbance in a rack force. The memory 210 here refers to both a non-volatile storage device that, although not supplied with electric power, keeps the information stored and a volatile storage device that needs to be supplied with electric power in order to keep the information stored. In addition, the memory 210 may perform a function of temporarily or permanently storing data processed by the processor 220. Examples of the memory 210 here may include a magnetic storage medium and a flash storage medium, as well as the volatile storage device that needs to be supplied with electric power to keep the information stored. The scope of the present disclosure is not limited thereto.

The processor 220 may acquire the estimated value of the rack force for minimizing the error representing the difference between the actual value of the rack force and the estimated value of the rack force, may extract the specific frequency component from the optimally estimated value of the rack force, and may remove the disturbance reflected in the actual value of the rack force by compensatingly subtracting the specific frequency component from the actual value of the rack force. The actual value of the rack force here, as a value resulting from measuring a rack force that is a load applied to the rack bar, may include a command value and the disturbance (noise). The disturbance (noise) has the specific frequency component. Therefore, the processor 220 may remove the disturbance reflected in the actual value of the rack force by performing an arithmetic operation of subtracting the specific frequency component, corresponding to the disturbance, from the actual value of the rack force.

The processor 220 may perform optimization in such a manner that the actual value of the rack force and the estimated value of the rack force are the same. The optimization here may mean minimization of the error representing the difference between the actual value of the rack force and the estimated value of the rack force. Therefore, the processor 220 may perform the optimization in such a manner that the difference between the actual value of the rack force and the estimated value of the rack force is 0.

Operation of the processor 220 is described with reference to FIG. 3.

The processor 220 may optimize the estimated value of the rack force by inputting the error representing the difference between the actual value of the rack force and the estimated value of the rack force into an optimization module 224. Then, the processor 220 may extract a vibration component from the optimally estimated value of the rack force and may compensatingly subtract the extracted vibration component from the actual value of the rack force, thereby removing the disturbance reflected in the actual value of the rack force. The estimated value of the rack force may be configured as the sum of a linear component and the vibration component, and the vibration component may be a signal having the form of sin and cos.

With reference to FIG. 3, the processor 220 may input the actual value of the rack force, and the estimated value of the rack force from the optimization module 224 into a first arithmetic-operation module 222 and may compute the error representing the difference between the actual value of the rack force and the estimated value of the rack force.

When the error is computed, the processor 220 may input the computed error into the optimization module 224, and the optimization module 224 may optimize the estimated value of the rack force in the direction of optimizing the error. At this point, the optimization module 224 may execute the optimization algorithm in the direction of minimizing the error and may acquire the optimally estimated value of the rack force.

The optimization module 224 may divide the optimally estimated value of the rack force into the linear component and the vibration component and may estimate the linear component and the vibration component. The vibration component here may be a signal having the form of sin and cos. A linear value, a sin value, and a cos value may vary in real time, and the optimization may be performed in the direction of increasing the degree of estimation.

The optimization module 224 may be configured to execute the optimization algorithm and estimate an optimized value of the rack force (the estimated value of the rack force) by applying the optimization algorithm to the error.

To this end, the processor 220 may define an objective function on the basis of the error and may apply the optimization algorithm to a gradient of the objection function. At this point, the processor 220 may apply various optimization algorithms, such as a conjugate gradient and a Nesterov accelerated gradient (NAG).

For example, the processor 220 may define the error as in following Equation 1.

$$\text{error}=x0+x1*\sin(2*pi*f*t)+x2*\cos(2*pi*f*t) \qquad \text{Equation 1}$$

where x0, x1, and x2 depict optimization parameters, f depicts a frequency, and t depicts time.

From Equation 1, it can be seen that the error is made up of x0 that is the linear component, and $x1*\sin(2*pi*f*t)+x2*\cos(2*pi*f*t)$ that is the vibration component.

The processor 220 may define an objective function (f(x)), as in following Equation 2, on the basis of the error.

$$f(x)=\tfrac{1}{2}*e^2 \qquad \text{Equation 2}$$

where e depicts the error.

When Equation 2 is solved, the objective function may be configured as the sum of sin and cos. Since the objective function is configured as the sum of sin and cos, two values of sin and cos may each be adjusted, and thus a phase of the estimated value of the rack force may be adjusted as desired.

The optimization may be to minimize the objective function because the error is minimized at a value for minimizing the objective function.

Accordingly, for the optimization, the processor 220 may define the gradient of the objective function as in following Equation 3.

$$\text{Gradient} = g = \nabla f(x) = \frac{1}{2}\frac{\partial e^2}{\partial x} = e\frac{\partial e}{\partial x} \qquad \text{Equation 3}$$

When the gradient of the objective function is defined as in Equation 3, the processor 220 may perform the optimization using various optimization algorithms, such as a Polak-Ribier max conjugate gradient and a Nesterov accelerated gradient (NAG).

The Polak-Ribier max conjugate gradient may be defined as in following Equation 4.

$$\beta = \min\left(0, \max\left(\frac{g_k^T * (g_k - g_{k-1})}{g_{k-1}^T g_{k-1}}, 1\right)\right) \qquad \text{Equation 4}$$

where $\beta$ depicts a weighted value on a moment effect, g depicts a gradient, and k depicts a step.

The processor 220 may perform update using the Nesterov accelerated gradient (NAG) algorithm, The NAG algorithm may be defined as in following Equation 5.

$$x_k=x_{k-1}+v_k \qquad \text{Equation 5}$$

where v depicts a moment, x depicts an optimization parameter, and a depicts a stepsize.

In Equation 4, the magnitude of $\beta$ is limited to 0 to 1. Therefore, convergence may be ensured, and the stepsize may be updated in the direction of decreasing it. That is, a tuning parameter may be limited to one stepsize. When the tuning parameter actually applies to the vehicle, this limitation may provide a high degree of convenience.

When the optimally estimated value of the rack force is acquired through the optimization module 224, the processor 220 may divide the optimally estimated value of the rack force into the linear component and the vibration component, and may input the vibration component into a second arithmetic-operation module 226.

The second arithmetic-operation module 226 may perform an arithmetic operation of subtracting the input vibration component from the actual value of the rack force and may output the result. That is, the second arithmetic-operation module 226 may perform the arithmetic operation of subtracting the vibration component from the actual value of the rack force and thus may remove the disturbance from the actual value of the rack force.

Figure 4:
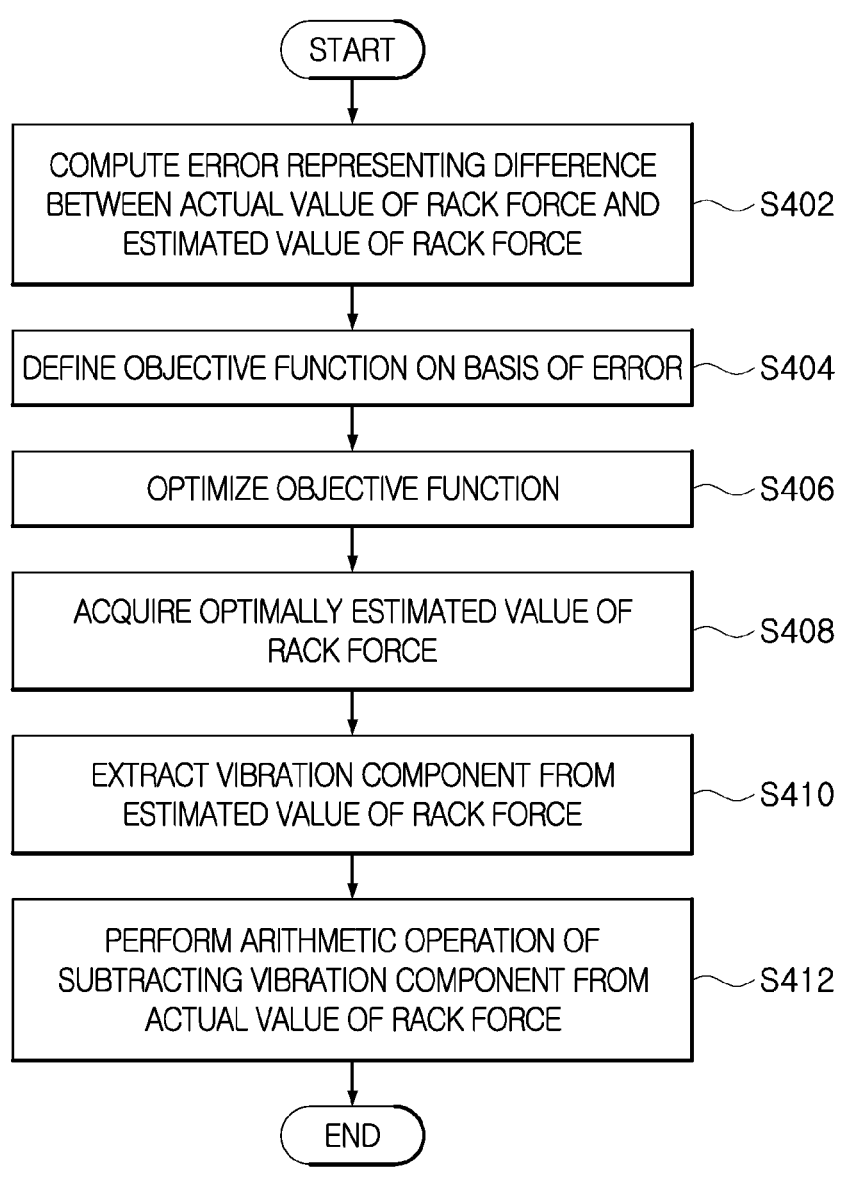
FIG. 4 is a flow chart that is referred to for description of a method of compensating for a disturbance in a rack force according to a second embodiment of the present disclosure.

FIG. 4 is a flow chart that is referred to for description of a method of compensating for a disturbance in a rack force according to a second embodiment of the present disclosure.

With reference to FIG. 4, the processor 220 computes the error representing the difference between the actual value of the rack force and the estimated value of the rack force (S402) and defines the objective function on the basis of the computed error (S404). At this point, the error may be made up with the linear component and the vibration component, and the objective function may be generated on the basis of the error. For example, the objective function may be defined as the square of the error. The objective function is generated on the basis of the error. Therefore, the objective function may be made up with the sum of sin and cos.

When Step S404 is performed, the processor 220 performs the optimization in such a manner that a value of the objective function is a minimum value (S406) and estimates the optimized value of the rack force (the estimated value of the rack force) (S408).

Since the minimization of the value of the objective function is to minimize the error, the optimization may be to minimize an objective function. Accordingly, for the optimization, the processor 220 may apply the optimization algorithm to the gradient of the objective function. When the optimization algorithm is applied to the gradient of the objective function, the processor 220 may acquire the optimally estimated value of the rack force. The optimally estimated value of the rack force may be made up with the linear component and the vibration component.

When Step S408 is performed, the processor 220 extracts the vibration component from the optimally estimated value of the rack force (S410) and performs the arithmetic operation of subtracting the extracted vibration component from the actual value of the rack force (S412). Then, the disturbance reflected in the actual value of the rack force may be removed.

The device for compensating for a disturbance in a rack force according to an aspect of the present disclosure and the method of compensating for a disturbance in a rack force according to another aspect of the present disclosure use the optimization algorithm in this manner. Accordingly, a delay is reduced more than when an existing filter is used. Moreover, the disturbance in a desired frequency band is decreased more effectively than when the existing filter is used. Thus, the delay of the estimated value of the rack force can be minimized, and at the same time, the disturbance at a desired frequency can be removed. As a result, the degree of the feeling of steering can be increased.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

Examples of the present disclosure may provide an improvement in minimizing a delay in acquiring the estimated value of the rack force, removing the disturbance reflected in the estimated value of the rack force, and increasing the degree of the feeling of steering that the driver experiences. This is in contrast to filters that remove the disturbance with a higher performance of the filter corresponding to a higher and decreased responsiveness of steering. For example, the Kalman filter greatly depends on the degree of the accuracy of the steering system model. Therefore, the Kalman filter has the disadvantage of being difficult to use for the estimated value of the rack force.

The device and method of compensating for a disturbance in a rack force use an optimization algorithm. Accordingly, a delay is reduced more than when an existing filter is used.

Moreover, the disturbance in a desired frequency band is decreased more effectively than when the existing filter is used. Thus, the delay of the estimated value of the rack force can be minimized, and at the same time, the disturbance at a desired frequency can be removed. As a result, the degree of the feeling of steering can be increased.

Furthermore, according to an aspect of the present disclosure, herein is provided a device for and a method of compensating for a disturbance in a rack force, minimizing a delay in acquiring an estimated value of a rack force, removing a disturbance reflected in the estimated value of the rack force, and thus increasing the degree of a feeling of steering that a driver experiences A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device for compensating for a disturbance in a rack force, the device comprising:
a memory configured to store one or more instructions; and
one or more processors configured to execute the one or more instructions to:
determine an optimally estimated value of a rack force for minimizing an error calculated as a difference between an actual value of the rack force and an estimated value of the rack force, wherein the one or more processors are configured to determine the optimally estimated value by iteratively adjusting one or more parameters of an estimated rack force model using a gradient-based optimization algorithm to minimize said error;
extract a specific frequency component from the optimally estimated value of the rack force; and
compensate for the extracted specific frequency component to the actual value of the rack force to remove a disturbance reflected in the actual value of the rack force.

2. The device of claim 1, wherein the one or more processors are further configured to execute an optimization algorithm to minimize the error and determine the optimally estimated value of the rack force.

3. The device of claim 2, wherein the one or more processors are further configured to:

define an objective function based on the error; and apply the optimization algorithm to a gradient of the objective function to determine the optimally estimated value of the rack force.

4. The device of claim 1, wherein the optimally estimated value of the rack force includes a linear component and a vibration component, and wherein the specific frequency component is the vibration component included in the optimally estimated value of the rack force.

5. The device of claim 4, wherein the one or more processors are further configured to:

subtract the vibration component from the actual value of the rack force to remove the disturbance from the actual value of the rack force.

6. A method of compensating for a disturbance in a rack force, the method comprising:

determining, by a processor, an error calculated as a difference between an actual value of a rack force and an estimated value of the rack force;

determining, by the processor, an optimally estimated value of the rack force for minimizing the error, wherein determining the optimally estimated value comprises iteratively adjusting one or more parameters of an estimated rack force model using a gradient-based optimization algorithm to minimize said error; and removing, by the processor, a disturbance reflected in the actual value of the rack force based on subtracting a specific frequency component included in the optimally estimated value of the rack force from the actual value of the rack force.

7. The method of claim 6, wherein determining the optimally estimated value of the rack force further comprises:

executing an optimization algorithm to minimize the error and determine the optimally estimated value of the rack force.

8. The method of claim 7, wherein determining the optimally estimated value of the rack force further comprises:

defining an objective function based on the error, and applying the optimization algorithm to a gradient of the objective function to determine the optimally estimated value of the rack force.

9. The method of claim 6, wherein the optimally estimated value of the rack force includes a linear component and a vibration component, and wherein the specific frequency component is the vibration component included in the optimally estimated value of the rack force.

10. The method of claim 9, further comprising:

subtracting the vibration component from the actual value of the rack force to remove the disturbance from the actual value of the rack force.

11. A steer-by-wire system comprising:

a steering wheel;

a reaction-force actuator connected to the steering wheel and configured to apply a reaction torque to the steering wheel;

a steering actuator connected to steered wheels and configured to steer the steered wheels;

a sensor configured to detect a rack force applied to a rack bar connected to the steered wheels; and a device for compensating for a disturbance in the rack force, the device comprising:

a memory configured to store one or more instructions; and one or more processors configured to execute the one or more instructions to:

determine an optimally estimated value of the rack force for minimizing an error calculated as a difference between an actual value of the rack force and an estimated value of the rack force, wherein the one or more processors are configured to determine the optimally estimated value by iteratively adjusting one or more parameters of an estimated rack force model using a gradient-based optimization algorithm to minimize said error;

extract a specific frequency component from the optimally estimated value of the rack force; and compensate for the extracted specific frequency component to the actual value of the rack force to remove a disturbance reflected in the actual value of the rack force, wherein a controller is configured to control the reaction-force actuator based on the compensated rack force to apply the reaction torque to the steering wheel.

* * * * *